US012772314B2

(12) United States Patent
Wu et al.

(10) Patent No.: US 12,772,314 B2
(45) Date of Patent: Oct. 20, 2026

(54) METHOD AND APPARATUS FOR MULTI-LINK OPERATION

(71) Applicant: MEDIATEK INC., Hsinchu City (TW)

(72) Inventors: Cheng-Ying Wu, Hsinchu City (TW); Wei-Wen Lin, Hsinchu City (TW); Shu-Min Cheng, Hsinchu City (TW); Hui-Ping Tseng, Hsinchu City (TW); Chi-Han Huang, Hsinchu City (TW); Chih-Chun Kuo, Hsinchu City (TW); Yang-Hung Peng, Hsinchu City (TW); Hao-Hua Kang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 408 days.

(21) Appl. No.: 18/504,340

(22) Filed: Nov. 8, 2023

(65) Prior Publication Data

US 2024/0163947 A1 May 16, 2024

Related U.S. Application Data

(60) Provisional application No. 63/479,553, filed on Jan. 12, 2023, provisional application No. 63/383,119, filed on Nov. 10, 2022.

(51) Int. Cl.
*H04W 92/02* (2009.01)
*H04W 76/10* (2018.01)
(Continued)

(52) U.S. Cl.
CPC ............ *H04W 76/15* (2018.02); *H04W 76/11* (2018.02); *H04W 88/08* (2013.01)

(58) Field of Classification Search
CPC ..... H04W 92/02; H04W 72/10; H04W 72/20; H04W 88/18
See application file for complete search history.

(56) References Cited

U.S. PATENT DOCUMENTS

2016/0337254 A1 11/2016 Karaki
2016/0344619 A1 * 11/2016 Yu ......................... H04L 45/245
(Continued)

FOREIGN PATENT DOCUMENTS

TW 202038660 A 10/2020
TW 202243454 A 11/2022
WO WO-2023101669 A1 * 6/2023 ........... H04L 1/0061

OTHER PUBLICATIONS

3GPP TSG RAN WG1 Meeting#98bis, R1-1911080 Title:On repeation schemes for NR PUSCH (Year: 2019).*
(Continued)

*Primary Examiner* — Faruk Hamza
*Assistant Examiner* — Abusayeed M Haque
(74) *Attorney, Agent, or Firm* — McClure, Qualey & Rodack, LLP

(57) ABSTRACT

A method for multi-link operation (MLO) is provided. The method for MLO may be applied to an apparatus. The method for MLO may include the following steps. A multi-chip controller of the apparatus may assign different data to a plurality of chips of the apparatus, wherein each chip corresponds to one link of multi-links. Each chip may determine whether transmission of the assigned data has failed. A first chip of the chips may transmit the assigned data to an access point (AP) in response to the first chip determining that the transmission of the assigned data has not failed.

20 Claims, 10 Drawing Sheets

(51) Int. Cl.

| | |
|---|---|
| ***H04W 76/11*** | (2018.01) |
| ***H04W 76/15*** | (2018.01) |
| ***H04W 80/02*** | (2009.01) |
| *H04W 88/08* | (2009.01) |

(56) References Cited

U.S. PATENT DOCUMENTS

| | | | | |
|---|---|---|---|---|
| 2023/0189380 | A1* | 6/2023 | Palat | H04W 76/11 370/329 |
| 2023/0275700 | A1* | 8/2023 | Kanamarlapudi | H04L 1/1812 370/328 |
| 2024/0064560 | A1* | 2/2024 | Konda | H04W 28/0278 |

OTHER PUBLICATIONS

3GPP TSG-RAN WG2#99bis, R2-1710106 Title:On extention of the number of dedicated radio bearer for E-UTRAN (Year: 2017).*

* cited by examiner

METHOD AND APPARATUS FOR MULTI-LINK OPERATION

CROSS REFERENCE TO RELATED APPLICATIONS

This application claims the benefits of U.S. Provisional Application No. 63/383,119 filed on Nov. 10, 2022 and U.S. Provisional Application No. 63/479,553 filed on Jan. 12, 2023, the entirety of which is incorporated by reference herein.

BACKGROUND OF THE INVENTION

Field of the Invention

The invention generally relates to wireless communications technology, and more particularly, to multiple chips applied for multi-link operation (MLO).

Description of the Related Art

As demand for ubiquitous computing and networking has grown, various wireless technologies have been developed, including Wireless-Fidelity (Wi-Fi) which is a Wireless Local Area Network (WLAN) technology allowing mobile devices (such as a smartphone, a smart pad, a laptop computer, a portable multimedia player, an embedded apparatus, or the like) to obtain wireless services in a frequency band of 2.4 GHz, 5 GHz, 6 Gz or 60 GHz.

The Institute of Electrical and Electronics Engineers (IEEE) has commercialized or developed various technological standards since an initial WLAN technology is supported using frequencies of 2.4 GHz. For example, IEEE 802.11ac supports Multi-User (MU) transmission using spatial degrees of freedom via a MU-Multiple Input-Multiple-Output (MU-MIMO) scheme in a downlink (DL) direction from an Access Point (AP) to Stations (STAs). To improve performance and meet users' demand for high-capacity and high-rate services, IEEE 802.11ax has been proposed, which uses both Orthogonal Frequency Division Multiple Access (OFDMA) and MU-MIMO in both DL and uplink (UL) directions. That is, in addition to supporting frequency and spatial multiplexing from an AP to multiple STAs, transmissions from multiple STAs to the AP are also supported in IEEE 802.11ax.

In a Wi-Fi multi-link operation (MLO), there exists several links between two Wi-Fi multi-link devices (MLDs), including one access point (AP) and one non-AP station (STA), that occupy different radio-frequency (RF) bands. One Wi-Fi MLD can perform channel access (e.g., enhanced distributed channel access (EDCA)) on multiple wireless links independently. Specifically, these wireless links can operate independently to increase the overall throughput and/or to improve the connection stability.

Therefore, how to perform MLO more efficiently and flexibly and achieve a balance between performance and cost is a topic that is worthy of discussion.

BRIEF SUMMARY OF THE INVENTION

Methods and apparatus for multi-link operation (MLO) are provided to overcome the problems mentioned above.

An embodiment of the invention provides a method for multi-link operation (MLO). The method for MLO may be applied to an apparatus. The method for MLO may comprise the following steps. A multi-chip controller of the apparatus may assign different data to a plurality of chips of the apparatus, wherein each chip corresponds to one link of multi-links. Each chip may determine whether transmission of the assigned data has failed. The first chip of the chips may transmit the assigned data to an access point (AP) in response to the first chip determining that the transmission of the assigned data has not failed.

An embodiment of the invention provides an apparatus for multi-link operation (MLO). The apparatus may comprise a transceiver, a Wi-Fi chip and a processor. The transceiver may be configured to perform wireless transmission and reception to and from an access point (AP). The Wi-Fi chip may comprise a multi-chip controller, a cross-chip controller and a plurality of chips, wherein each chip corresponds to one link of multi-links. The processor may be coupled to the transceiver and the Wi-Fi chip. The processor may controlling the Wi-Fi chip to assign different data to the chips of the apparatus through the multi-chip controller, determine whether transmission of the assigned data has failed via each of the chips, and transmit the assigned data to the AP through the transceiver via a first chip of the chips in response to the first chip determining that the transmission of the assigned data has not failed.

An embodiment of the invention provides a Wi-Fi chip for multi-link operation (MLO). The Wi-Fi chip may comprise a multi-chip controller, a cross-chip controller, and a plurality of chips, wherein each chip corresponds to one link of multi-links. The multi-chip controller may assign different data to the chips. Each of the chips may determine whether transmission of the assigned data has failed. A first chip of the chips may transmit the assigned data to an access point (AP) in response to the first chip determining that the transmission of the assigned data has not failed.

Other aspects and features of the invention will become apparent to those with ordinary skill in the art upon review of the following descriptions of specific embodiments of the methods and apparatus for MLO.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
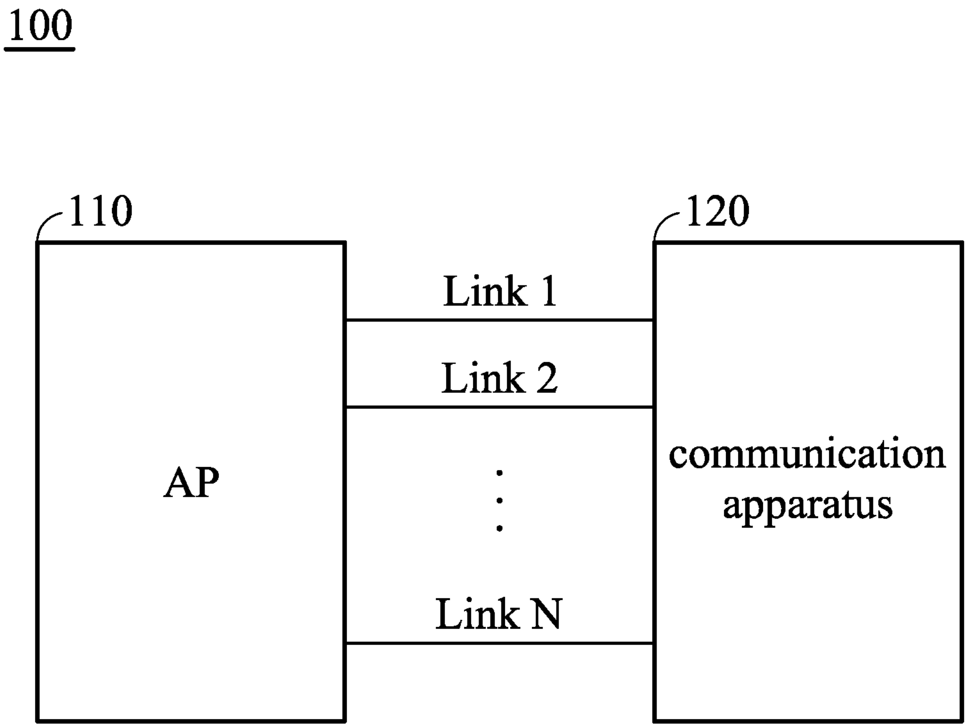
FIG. 1 is a block diagram of a wireless communication system 100 according to an embodiment of the application.

FIG. 1 is a block diagram of a wireless communication system 100 according to an embodiment of the application. As shown in FIG. 1, the wireless communication system 100 may include an Access Point (AP) 110 and a communication apparatus 120. The AP 110 and the communication apparatus 120 may be the multi-link devices (MLDs). That is, the AP 110 may perform multi-link operation (MLO) with the communication apparatus 120 through multiple wireless links Link 1, Link 2 . . . Link N. The AP 110 is an entity compatible with the Institute of Electrical and Electronics Engineers (IEEE) 802.11 standards to provide and manage the access to the wireless medium for the communication apparatus 120. It should be noted that, in order to clarify the concept of the invention, FIG. 1 presents a simplified block diagram in which only the elements relevant to the invention are shown. However, the invention should not be limited to what is shown in FIG. 1.

In an embodiment of the invention, the AP 110 may be an Extremely High Throughput (EHT) AP which is compatible with the IEEE 802.11be standards. In another embodiment of the invention, the AP 110 may be an AP which is compatible with any IEEE 802.11 standards later than 802.11be.

Each of the communication apparatus 120 may be a non-AP station (STA), a mobile phone (e.g., feature phone or smartphone), a panel Personal Computer (PC), a laptop computer, or any computing device, as long as it is compatible with the same IEEE 802.11 standards as the AP 110. The communication apparatus 120 may associate and communicate with the AP 110 to send or receive data in an uplink (UL) or downlink (DL) Multi-User-Physical layer Protocol Data Unit (MU-PPDU). The MU-PPDU may be a resource-unit Orthogonal Frequency Division Multiple Access (RU-OFDMA), a MU-Multiple Input-Multiple-Output (MU-MIMO) PPDU, or an aggregated PPDU.

Figure 2:
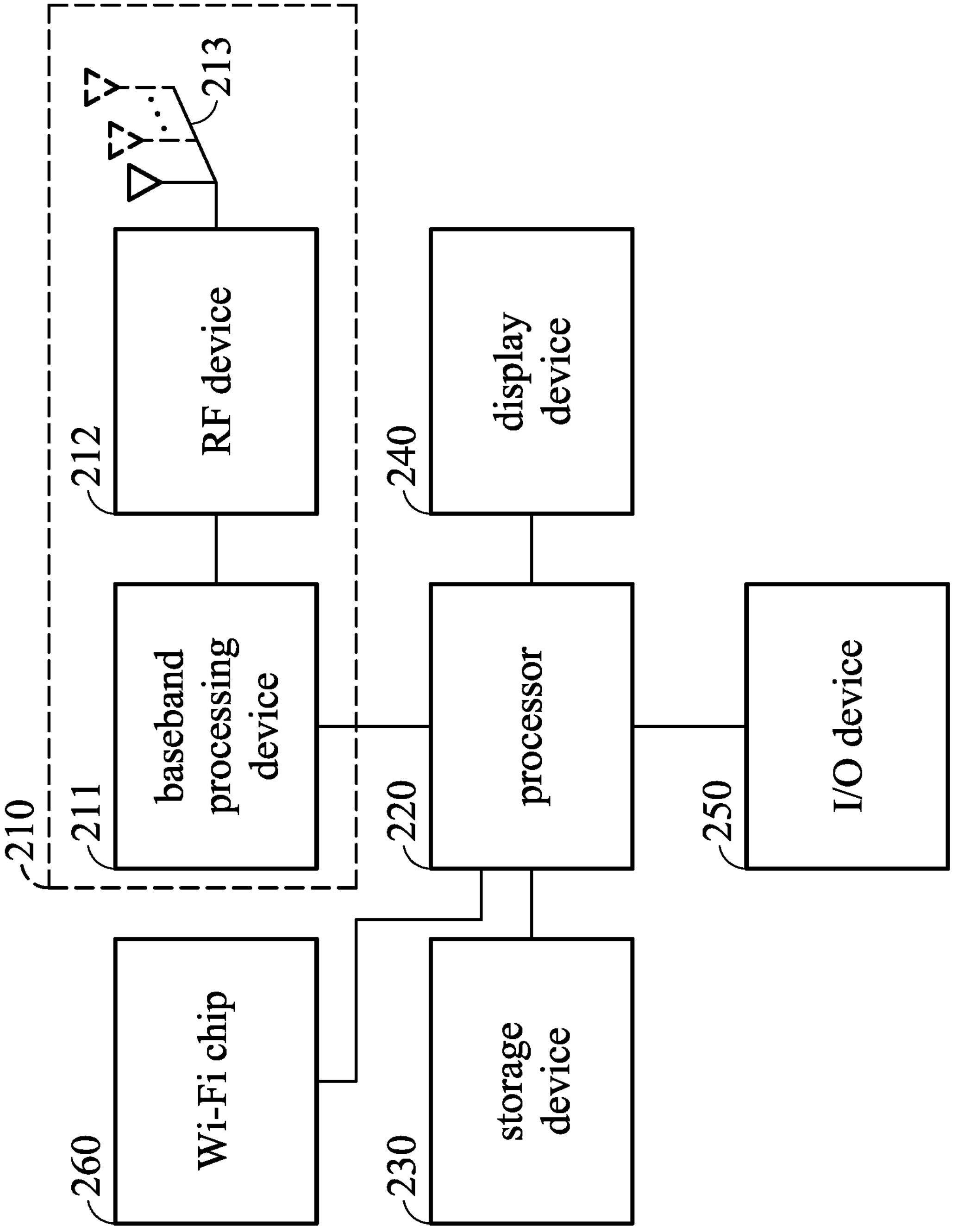
FIG. 2 is a block diagram illustrating a communication apparatus according to an embodiment of the application.

FIG. 2 is a block diagram illustrating a communication apparatus according to an embodiment of the application. The communication apparatus can be applied to the communication apparatus 120. As shown in FIG. 2, a communication apparatus may include a wireless transceiver 210, a processor 220, a storage device 230, a display device 240, an Input/Output (I/O) device 250, and a Wi-Fi chip 260.

The wireless transceiver 210 may be configured to perform wireless transmission and reception to and from the AP 110.

Specifically, the wireless transceiver 210 may include a baseband processing device 211, a Radio Frequency (RF) device 212, and antenna 213, wherein the antenna 213 may include an antenna array for UL/DL MIMO.

The baseband processing device 211 may be configured to perform baseband signal processing, such as Analog-to-Digital Conversion (ADC)/Digital-to-Analog Conversion (DAC), gain adjusting, modulation/demodulation, encoding/decoding, and so on. The baseband processing device 211 may contain multiple hardware components, such as a baseband processor, to perform the baseband signal processing.

The RF device 212 may receive RF wireless signals via the antenna 213, convert the received RF wireless signals to baseband signals, which are processed by the baseband processing device 211, or receive baseband signals from the baseband processing device 211 and convert the received baseband signals to RF wireless signals, which are later transmitted via the antenna 213. The RF device 212 may also contain multiple hardware devices to perform radio frequency conversion. For example, the RF device 212 may include a mixer to multiply the baseband signals with a carrier oscillated in the radio frequency of the supported cellular technologies, wherein the radio frequency may be 2.4 GHz, 5 GHz, or 60 GHz utilized in the Wi-Fi technology, or any radio frequency utilized in the future evolution of the Wi-Fi technology.

The processor 220 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 210 for wireless communications with the AP 110, storing and retrieving data (e.g., program code) to and from the storage device 230, sending a series of frame data (e.g. representing text messages, graphics, images, etc.) to the display device 240, and receiving user inputs or outputting signals via the I/O device 250.

In particular, the processor 220 coordinates the aforementioned operations of the wireless transceiver 210, the storage device 230, the display device 240, the I/O device 250, and the Wi-Fi chip 260 for performing the method of the present application.

In another embodiment, the processor 220 may be incorporated into the baseband processing device 211, to serve as a baseband processor.

As will be appreciated by persons skilled in the art, the circuits of the processor 220 may include transistors that are configured in such a way as to control the operation of the circuits in accordance with the functions and operations described herein. As will be further appreciated, the specific structure or interconnections of the transistors may be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 230 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, communication protocols, and/or the method of the present application.

The display device 240 may be a Liquid-Crystal Display (LCD), a Light-Emitting Diode (LED) display, an Organic LED (OLED) display, or an Electronic Paper Display (EPD), etc., for providing a display function. Alternatively, the display device 240 may further include one or more touch sensors for sensing touches, contacts, or approximations of objects, such as fingers or styluses.

The I/O device 250 may include one or more buttons, a keyboard, a mouse, a touch pad, a video camera, a micro-phone, and/or a speaker, etc., to serve as the Man-Machine Interface (MMI) for interaction with users.

According to an embodiment of the invention, the Wi-Fi chip 260 may be configured to perform the operations of Wi-Fi communications. Details for the architecture of the Wi-Fi chip are discussed below via FIG. 4. In another embodiment of the invention, the wireless transceiver 210 may be also combined with the Wi-Fi chip 260 to form a Wi-Fi chip.

It should be understood that the components described in the embodiment of FIG. 2 are for illustrative purposes only and are not intended to limit the scope of the application. For example, a communication apparatus may include more components, such as another wireless transceiver for providing telecommunication services, a Global Positioning System (GPS) device for use of some location-based services or applications, and/or a battery for powering the other components of the communication apparatus, etc. Alternatively, a communication apparatus may include fewer components. For example, the communication apparatus may not include the display device 240 and/or the I/O device 250.

Figure 3:
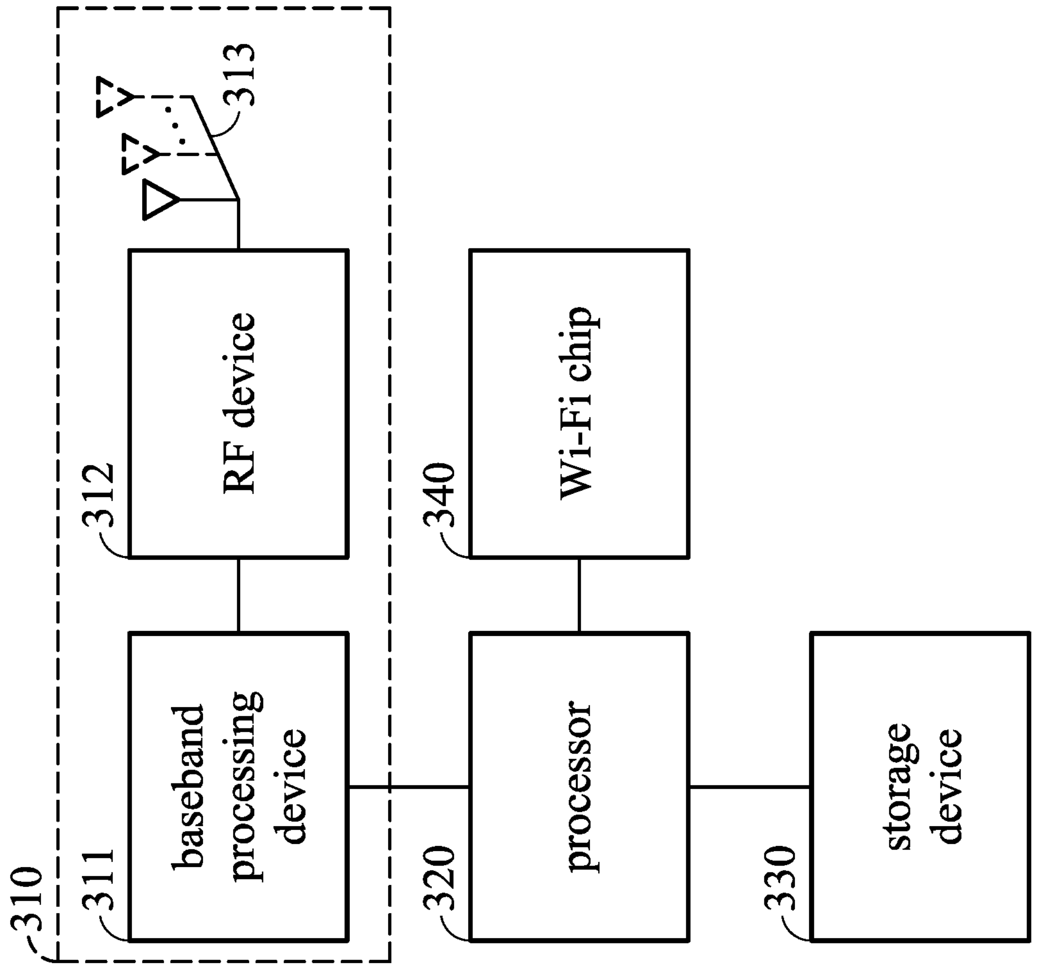
FIG. 3 is a block diagram illustrating an AP according to an embodiment of the application.

FIG. 3 is a block diagram illustrating an AP according to an embodiment of the application. The AP can be applied to the AP 110. As shown in FIG. 3, an AP may include a wireless transceiver 310, a processor 320, a storage device 330 and a Wi-Fi chip 340. The wireless transceiver 310 is configured to perform wireless transmission and reception to and from one or more communication apparatuses (e.g., the communication apparatus 120).

Specifically, the wireless transceiver 310 may include a baseband processing device 311, an RF device 312, and antenna 313, wherein the antenna 313 may include an antenna array for UL/DL MU-MIMO.

The baseband processing device 311 is configured to perform baseband signal processing, such as ADC/DAC, gain adjusting, modulation/demodulation, encoding/decoding, and so on. The baseband processing device 311 may contain multiple hardware components, such as a baseband processor, to perform the baseband signal processing.

The RF device 312 may receive RF wireless signals via the antenna 313, convert the received RF wireless signals to baseband signals, which are processed by the baseband processing device 311, or receive baseband signals from the baseband processing device 311 and convert the received baseband signals to RF wireless signals, which are later transmitted via the antenna 313. The RF device 312 may also contain multiple hardware devices to perform radio frequency conversion. For example, the RF device 312 may include a mixer to multiply the baseband signals with a carrier oscillated in the radio frequency of the supported cellular technologies, wherein the radio frequency may be 2.4 GHz, 5 GHz, or 60 GHz utilized in the Wi-Fi technology, or any radio frequency utilized in the future evolution of the Wi-Fi technology.

The processor 320 may be a general-purpose processor, an MCU, an application processor, a DSP, a GPH/HPU/NPU, or the like, which includes various circuits for providing the functions of data processing and computing, controlling the wireless transceiver 310 for wireless communications with the communication apparatus 120, and storing and retrieving data (e.g., program code) to and from the storage device 330.

In particular, the processor 320 coordinates the aforementioned operations of the wireless transceiver 310, the storage device 330 and the Wi-Fi chip 340 for performing the method of the present application.

In another embodiment, the processor 320 may be incorporated into the baseband processing device 311, to serve as a baseband processor.

As will be appreciated by persons skilled in the art, the circuits of the processor 320 may include transistors that are configured in such a way as to control the operation of the circuits in accordance with the functions and operations described herein. As will be further appreciated, the specific structure or interconnections of the transistors may be determined by a compiler, such as an RTL compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 330 may be a non-transitory machine-readable storage medium, including a memory, such as a FLASH memory or a NVRAM, or a magnetic storage device, such as a hard disk or a magnetic tape, or an optical disc, or any combination thereof for storing data, instructions, and/or program code of applications, communication protocols, and/or the method of the present application.

According to an embodiment of the invention, the Wi-Fi chip 340 may be configured to perform the operations of Wi-Fi communications. Details for the architecture of the Wi-Fi chip are discussed below via FIG. 4. In another embodiment of the invention, the wireless transceiver 310 may be also combined with the Wi-Fi chip 340 to form a Wi-Fi chip.

It should be understood that the components described in the embodiment of FIG. 3 are for illustrative purposes only and are not intended to limit the scope of the application. For example, an AP may include more components, such as a display device for providing a display function, and/or an I/O device for providing an MMI for interaction with users.

Figure 4:
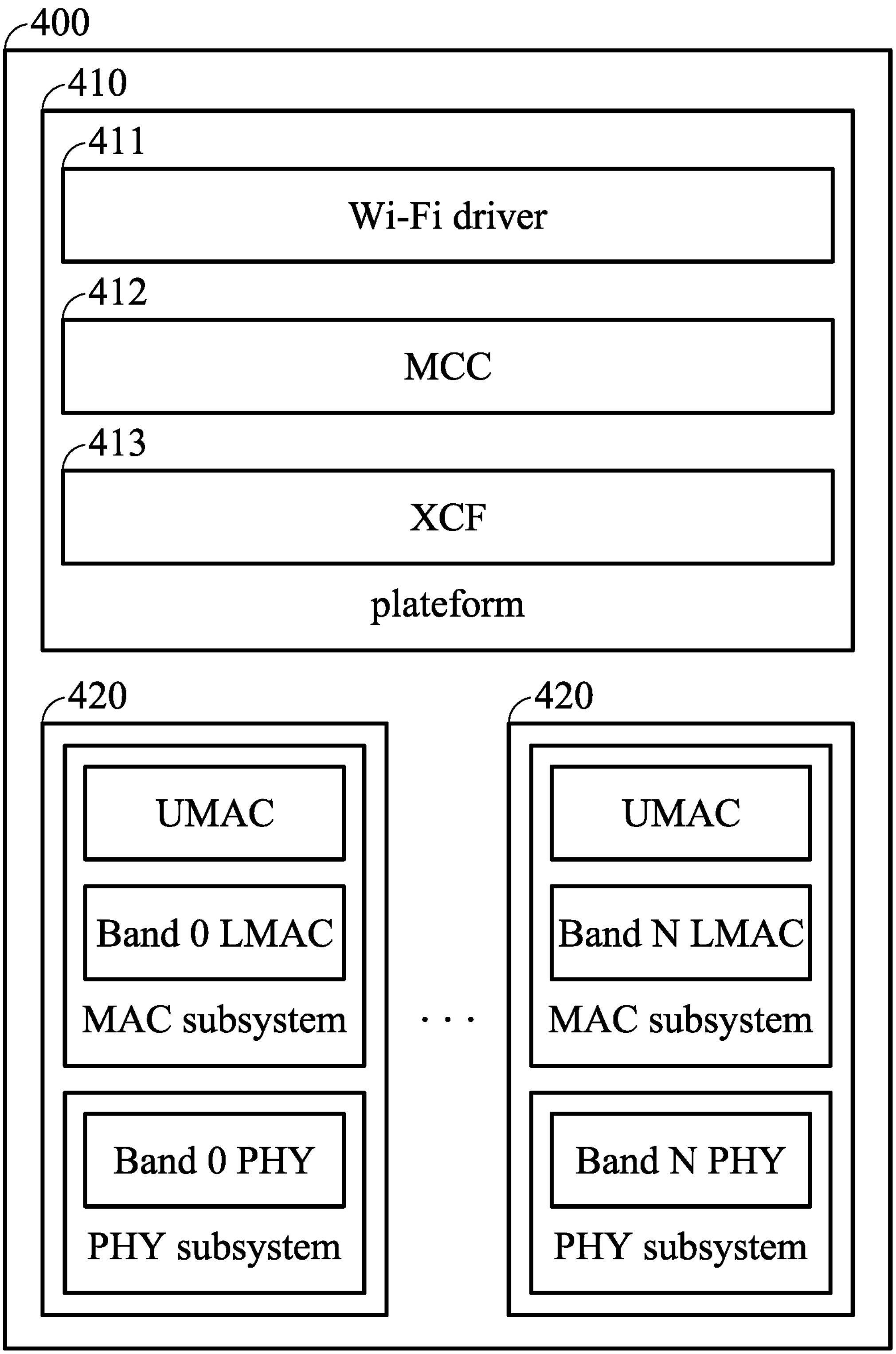
FIG. 4 is a block diagram illustrating a Wi-Fi chip according to an embodiment of the application.

FIG. 4 is a block diagram illustrating a Wi-Fi chip 400 according to an embodiment of the application. The Wi-Fi chip 400 can be applied to the AP 110 and the communication apparatus 120. As shown in FIG. 4, the Wi-Fi chip 400 may comprise a platform 410 and a plurality of chips 420 (e.g., chip 420 #1 and chip 420 #2 of FIGS. 5-7, but the invention should not be limited thereto). The platform 410 may comprise a Wi-Fi driver 411, a multi-chip controller (MCC) 412 and a cross-chip controller (XCF) 413. The MCC 412 may be configured to perform a transmission (TX) window control, assign sequence numbers (SNs) and packet numbers (PNs), and perform a downlink (DL) dispatch. The XCF 413 may be configured to perform a cross-chip timing synchronization, a medium access control (MAC) PDU (MPDU) cross-chip retransmission, and a reordering buffer control. In an embodiment, the MCC 412 and the XCF 413 may be realized via software. In another embodiment, the MCC 412 and the XCF 413 may be realized via hardware.

Each chip 420 may comprise a medium access control (MAC) subsystem comprising an upper MAC (UMAC) and a lower MAC (LMAC) and a physical (PHY) subsystem. In addition, according to the embodiments of the invention, each chip 420 may correspond to a band and a link. That is, each chip 420 may be configured to perform the transmission and reception of one link.

Figure 5:
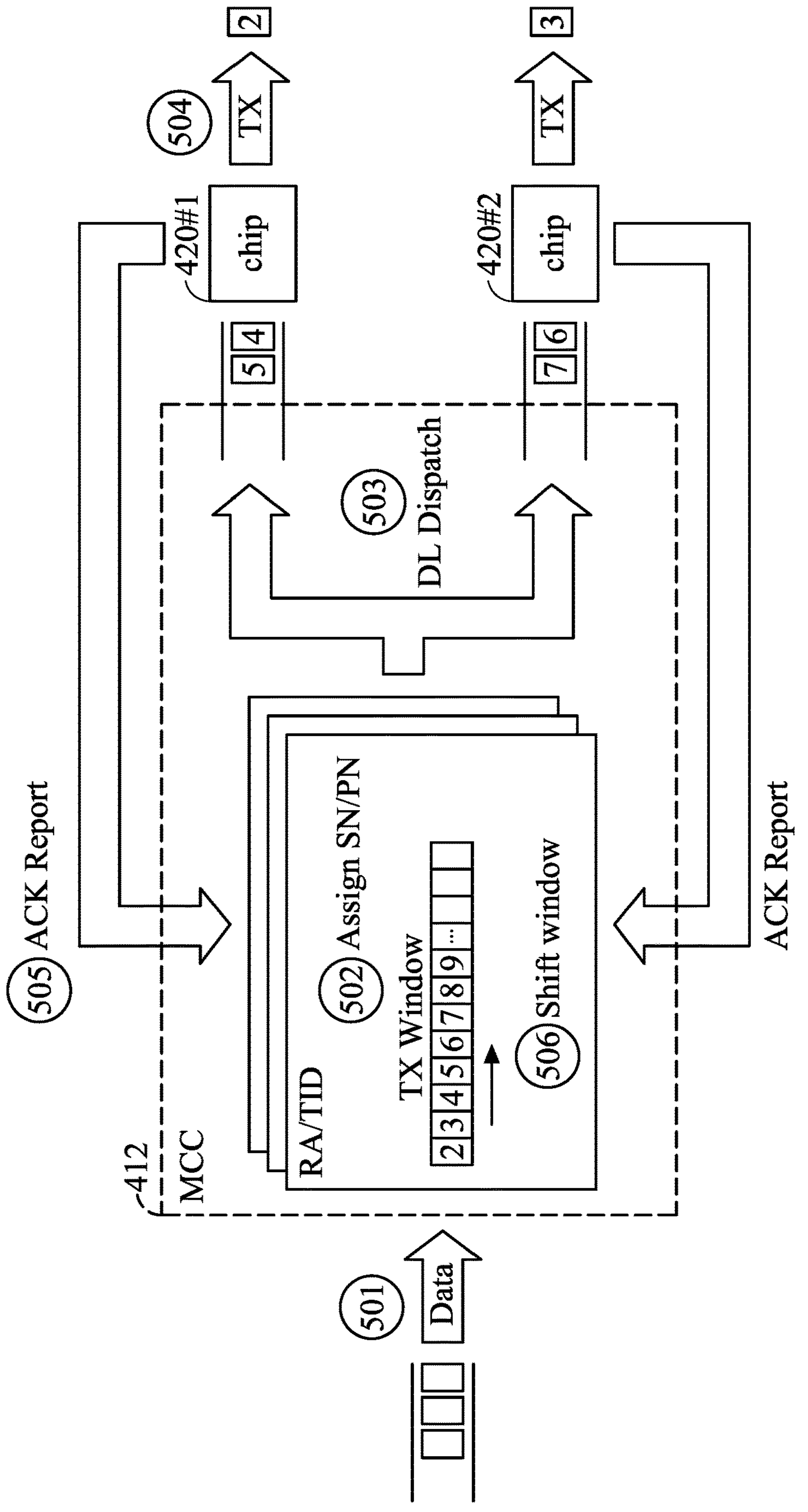
FIG. 5 is a schematic diagram illustrating a TX operation for MLO according to an embodiment of the application.

FIG. 5 is a schematic diagram illustrating a TX operation for MLO according to an embodiment of the application. As shown in FIG. 5, in step 501, the Wi-Fi driver 411 may transmit data to the MCC 412.

In step 502, the MCC 412 may be assign a sequence number (SN) or/and a packet number (PN) to each data based on a TX window. Specifically, the MCC 412 may check the TX window to determine whether there is available SN can be assigned to the current data. If there is no available SN, the MCC 412 may wait an available SN (i.e., released SN). If there is an available SN, the MCC 412 may assign the available SN to data. In addition, as shown in FIG. 5, the MCC 412 may be configured to control the data transmission for different block acknowledgement (BA) sessions. Each BA session may correspond to a recipient address (RA) and a traffic identifier (TID).

In step 503, the MCC 412 may transmit different data to the chip 420 #1 and chip 420 #2 based on the assigned SNs and PNs. For example, the MCC 412 may transmit the data 2, data 4 and data 5 to the chip 420 #1 and transmit the data 3, data 6 and data 7 to the chip 420 #2, i.e. downlink (DL) dispatch.

In step 504, the chip 420 #1 may transmit the data 2 to the AP 110 or the communication apparatus 120 through the wireless transceiver of the communication apparatus 120 or the AP 110, and the chip 420 #2 may transmit the data 3 to the AP 110 or the communication apparatus 120 through the wireless transceiver of the communication apparatus 120 or the AP 110.

In step 505, after the chip 420 #1 transmits the data 2 to the AP 110 through the wireless transceiver of the communication apparatus 120 successfully or transmits the data 2 to the communication apparatus 120 through the wireless transceiver of the AP 110 successfully, the chip 420 #1 may also transmit an acknowledgement (ACK) report to the MCC 412. In addition, after the chip 420 #2 transmits the data 3 to the AP 110 through the wireless transceiver of the communication apparatus 120 successfully or transmits the data 3 to the communication apparatus 120 through the wireless transceiver of the AP 110 successfully, the chip 420 #2 may also transmit an ACK report to the MCC 412.

In step 506, after the MCC 412 receives the ACK reports from the chip 420 #1 and the chip 420 #2, the MCC 412 may shift the TX window based on the ACK reports. Specifically, after the MCC 412 receives the ACK reports from the chip 420 #1 and the chip 420 #2, the MCC 412 may release the SNs of the data corresponding to the ACK reports, and then the MCC 412 may shift the TX window. It can be noted that the MCC 412 may shift the TX window for the data which is not transmitted successfully. For example, because based on the ACK reports from the chip 420 #1 and the chip 420 #2, the MCC 412 may know that the data 2 and 3 have been transmitted successfully, the MCC 412 may shift an initial position of the TX window to data 4.

Figure 6:
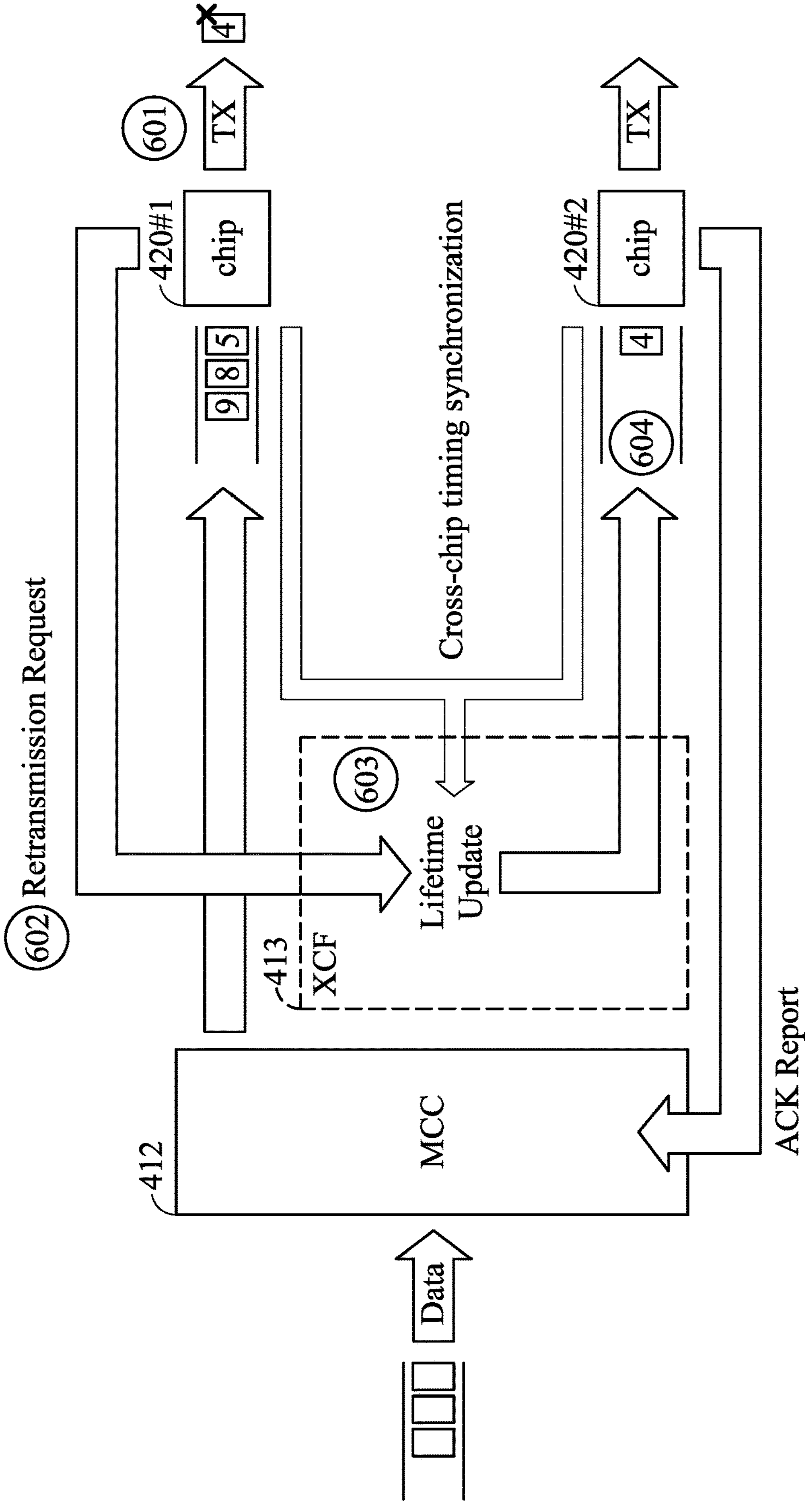
FIG. 6 is a schematic diagram illustrating a cross-chip retransmission according to an embodiment of the application.

FIG. 6 is a schematic diagram illustrating a cross-chip retransmission according to an embodiment of the application. As shown in FIG. 6, in step 601, the chip 420 #1 may determine whether the transmission of the assigned data 4 has failed.

In step 602, when the chip 420 #1 determines that the transmission of the assigned data 4 has failed, the chip 420 #1 may transmit a retransmission request to the XCF 413.

In step 603, after the XCF 413 receives the retransmission request from the chip 420 #1, the XCF 413 may select another chip 420 (e.g., the chip 420 #2) to retransmit the data 4. In addition, the XCF 413 may perform a cross-chip timing synchronization for the chip 420 #1 and chip 420 #2, and update the MPDU lifetime. For example, the cross-chip timing synchronization is used for identifying timing difference between these chips and update the MPDU lifetime accordingly.

In step 604, the XCF 413 may assign the data 4 to the chip 420 #2, and the chip 420 #2 may retransmit the data 4. That is, the data 4 may be queued into the TX queue corresponding to the chip 420 #2. When the data 4 has transmitted to the AP 110 or communication apparatus 120 successfully, the chip 420 #2 may transmit an ACK report to the MCC 412.

Figure 7:
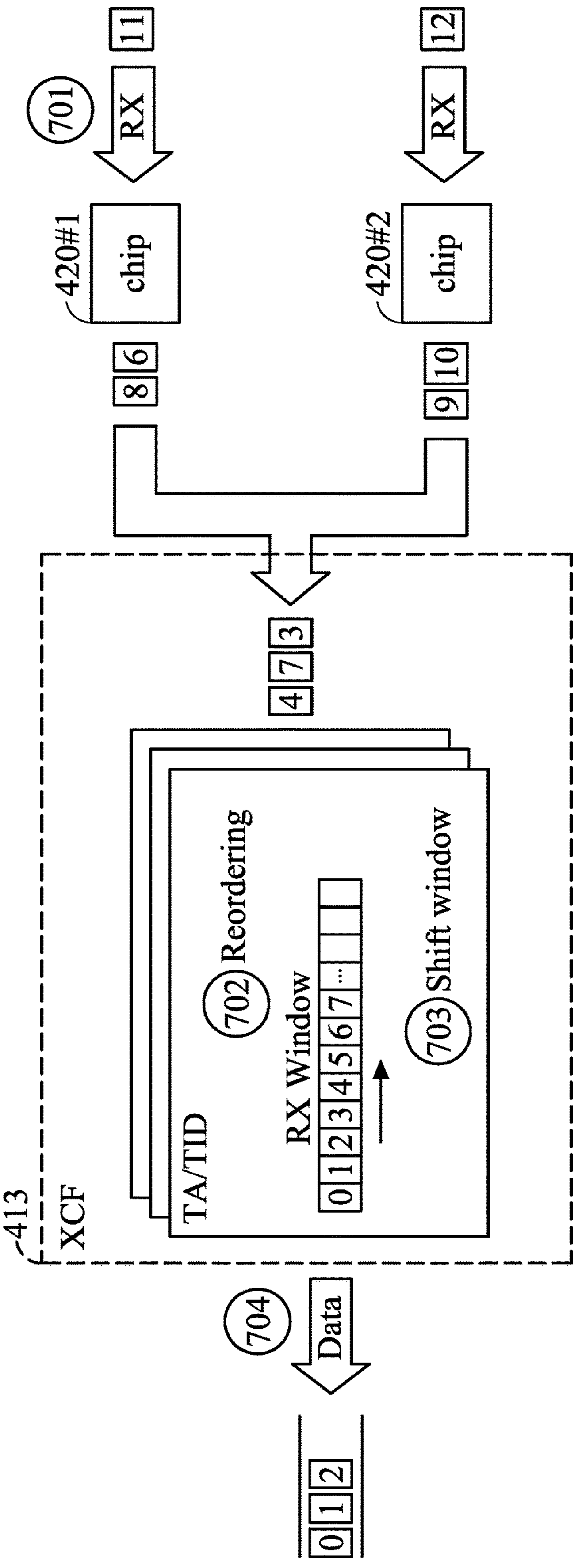
FIG. 7 is a schematic diagram illustrating a reordering buffer control according to an embodiment of the application.

FIG. 7 is a schematic diagram illustrating a reordering buffer control according to an embodiment of the application. As shown in FIG. 7, in step 701, the chip 420 #1 and the chip 420 #2 may receive data (e.g., data 11, 12) from the wireless transceiver, and the chip 420 #1 and the chip 420 #2 may transmit the received data (e.g., data 4, 7, 3, 9, 10) to the XCF 413.

In step 702, when the XCF 413 receives data from the chip 420 #1 and the chip 420 #2, the XCF 413 may record the data from the chip 420 #1 and the chip 420 #2. That is, the XCF 413 may record the data based on the order of the reception (RX) window.

In step 703, after the XCF 413 recorders the data from the chip 420 #1 and the chip 420 #2, the XCF 413 may determine whether to shift the RX window. For example, because data 0, 1 and 2 have been transmitted to the Wi-Fi driver 411, the XCF 413 may shift an initial position of the RX window to data 3. In addition, as shown in FIG. 7, the XCF 413 may be configured to control the data reception for different block acknowledgement (BA) sessions. Each BA session may correspond to a transmitter address (TA) and a traffic identifier (TID).

In step 704, the XCF 413 may transmit the data to the Wi-Fi driver 411 in order based on the RX window. Specifically, in step 702 the XCF 413 may determine whether the data's SN corresponds to an initial position of the RX window. If the data's SN does not correspond to the initial position of the RX window, the XCF 413 may buffer the data in order based on the RX window. If the data's SN corresponds to the initial position of the RX window, in step 703, the XCF 413 may shift the RX window, and then, in step 704 the XCF 413 may transmit the data to the Wi-Fi driver 411 in order.

Figure 8:
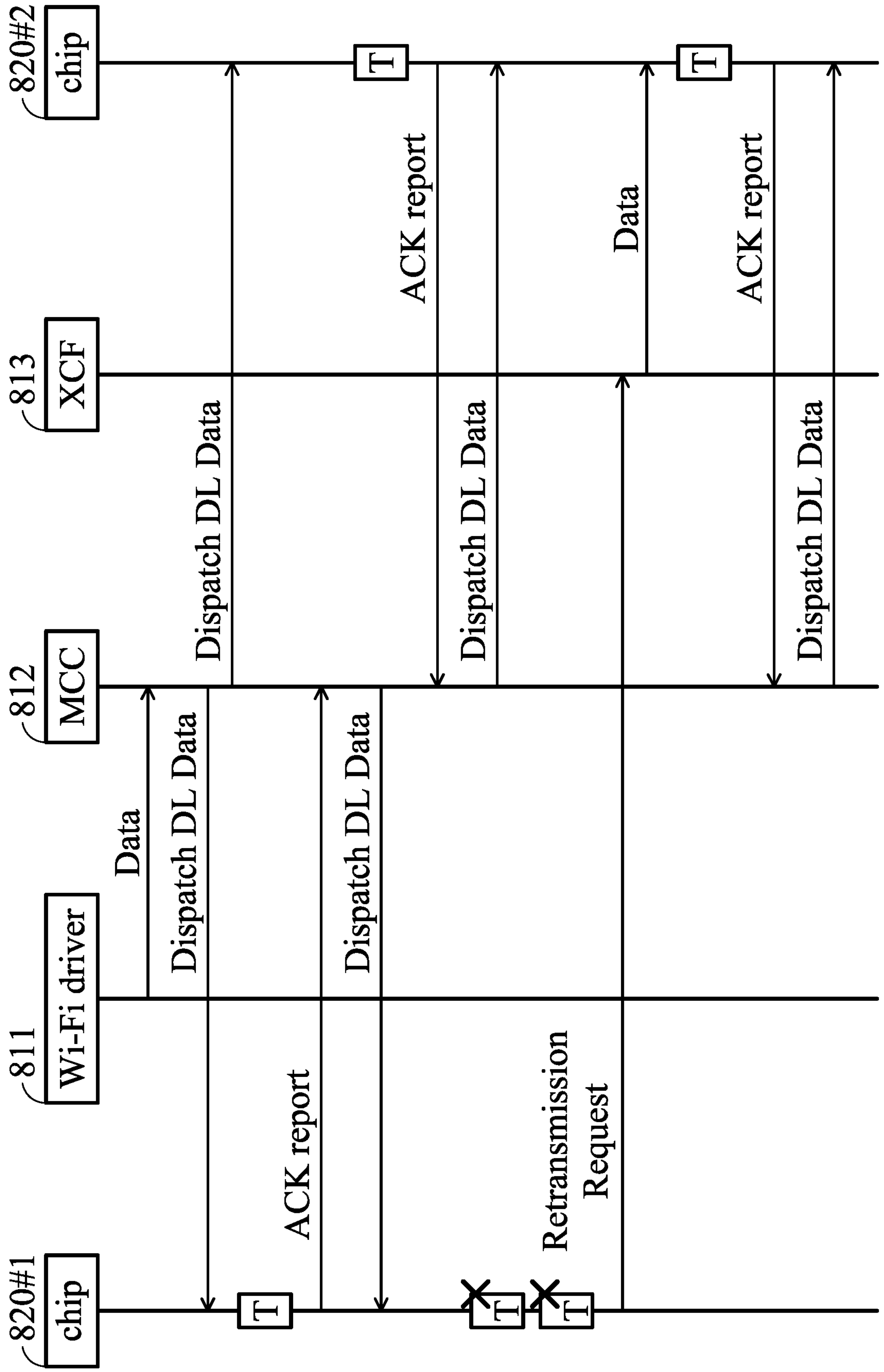
FIG. 8 is a flow chart illustrating a TX operation for MLO according to an embodiment of the invention.

FIG. 8 is a flow chart illustrating a TX operation for MLO according to an embodiment of the invention. The TX operation may be applied to Wi-Fi chip 400. In step S801, the Wi-Fi driver 811 may transmit data to the MCC 812.

In step S802, the MCC 812 may transmit data to the chip 820 #1.

In step S803, the MCC 812 may transmit data to the chip 820 #2. The data transmitted to the chip 820 #2 may be different from the data transmitted to the chip 820 #1. That is, the data transmitted to the chip 820 #2 may have different SNs and PNs from the data transmitted to the chip 820 #1.

In step S804, when the chip 820 #1 transmits the data to the transceiver successfully, the chip 820 #1 may transmit an ACK report to the MCC 812.

In step S805, the MCC 812 may transmit other data to the chip 820 #1.

In step S806, when the chip 820 #2 transmits the data to the transceiver successfully, the chip 820 #2 may transmit an ACK report to the MCC 812.

In step S807, the MCC 812 may transmit other data to the chip 820 #2.

In step S808, when the chip 820 #1 does not transmit the data to the transceiver successfully, the chip 820 #1 may transmit a retransmission request to the XCF 813.

In step S809, the XCF 813 may assign the data originally transmitted (or assigned) to the chip 820 #1 to the chip 820 #2.

In step S810, when the chip 820 #2 transmits the data to the transceiver successfully, the chip 820 #2 may transmit an ACK report to the MCC 812.

In step S811, the MCC 812 may transmit other data to the chip 820 #2.

Figure 9:
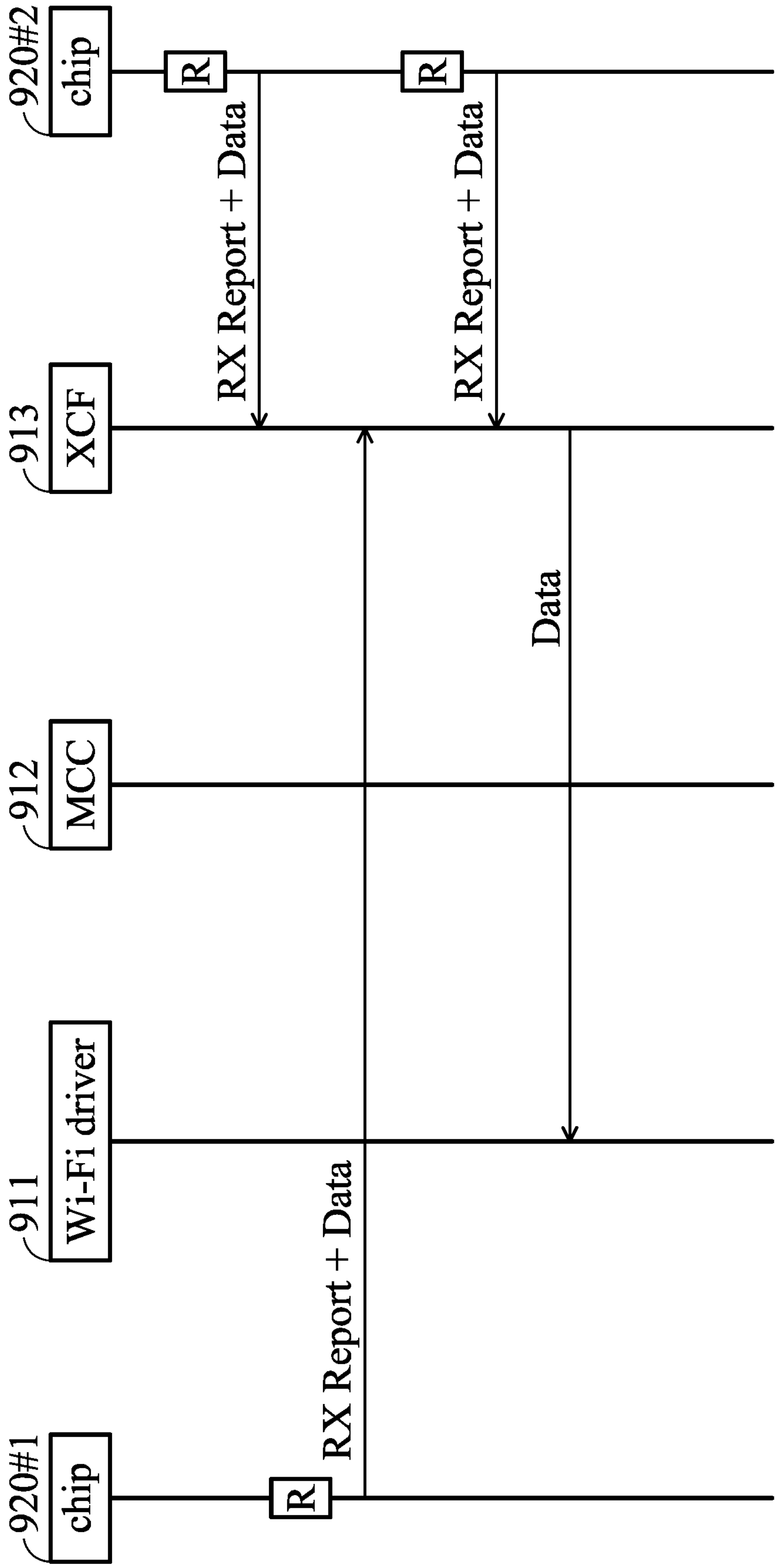
FIG. 9 is a flow chart illustrating a RX operation for MLO according to an embodiment of the invention.

FIG. 9 is a flow chart illustrating a RX operation for MLO according to an embodiment of the invention. The RX operation may be applied to Wi-Fi chip 400. In step S901, the chip 920 #2 may transmit a RX report and data to the XCF 913.

In step S902, the chip 920 #1 may also transmit a RX report and data to the XCF 913.

In step S903, the chip 920 #2 may transmit a RX report and other data to the XCF 913.

In step S904, the XCF 913 may reorder the data from the chip 920 #1 and the chip 920 #2, and then transmit the data in order to the Wi-Fi driver 911.

Figure 10:
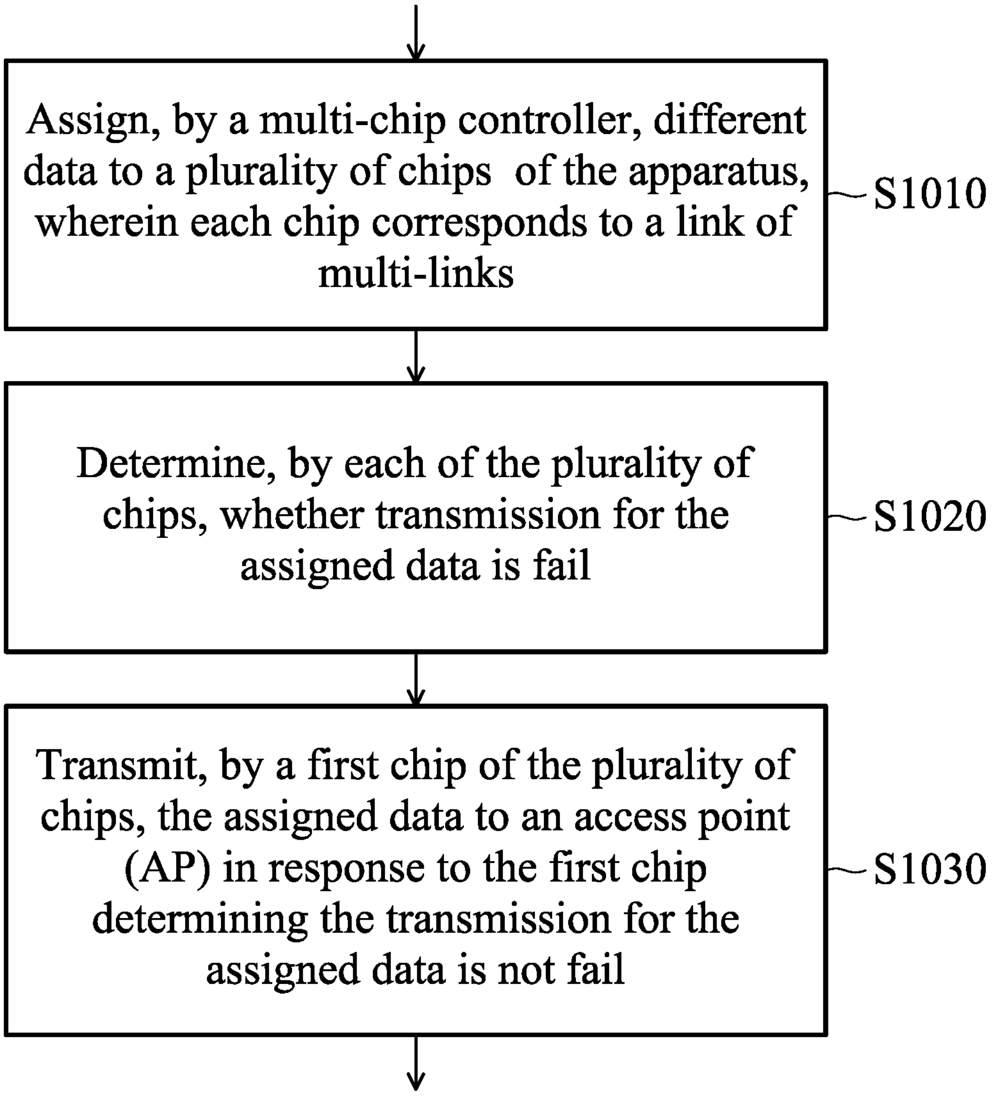
FIG. 10 is a flow chart illustrating a method for MLO according to an embodiment of the invention.

FIG. 10 is a flow chart illustrating a method for multi-link operation (MLO) according to an embodiment of the invention. The method for MLO can be applied to the wireless communication system 100. As shown in FIG. 10, in step S1010, a multi-chip controller of the wireless communication system 100 may assign different data to a plurality of chips of the wireless communication system 100, wherein each chip may correspond to one link of multi-links.

In step S1020, each of the plurality of chips may determine whether transmission of the assigned data has failed. Furthermore, it may set a threshold of failure times as a determination criterion.

In step S1030, when a first chip of the plurality of chips determines that the transmission of the assigned data has not failed, the first chip may transmit the assigned data to an access point (AP).

In some embodiments of the invention, in the method for MLO, the when the first chip of the wireless communication system 100 determines that the transmission of the assigned data has failed, the first chip of the wireless communication system 100 may transmit a retransmission request to a cross-chip controller of the wireless communication system 100. Then, the cross-chip controller of the wireless communication system 100 may assign the assigned data originally assigned to the first chip to another chip of the wireless communication system 100.

In some embodiments of the invention, in the method for MLO, the cross-chip controller of the wireless communication system 100 may further perform a cross-chip timing synchronization for the plurality of chips, and update a medium access control (MAC) PDU (MPDU) lifetime.

In some embodiments of the invention, in the method for MLO, the multi-chip controller of the wireless communication system 100 may further assign a sequence number (SN) or a packet number (PN) to each data based on a transmission (TX) window, and assign different data to the plurality of chips of the wireless communication system 100 based on the assigned SNs and PNs.

In some embodiments of the invention, in the method for MLO, the first chip of the wireless communication system 100 may transmit an acknowledgement (ACK) report to the multi-chip controller of the wireless communication system 100, when the assigned data have been transmitted to the AP successfully. Then, the multi-chip controller of the wireless communication system 100 may shift a TX window in response to receiving the ACK report from the first chip.

In some embodiments of the invention, in the method for MLO, the cross-chip controller of the wireless communication system 100 may further reorder received data from the plurality of chips. Then, the cross-chip controller of the wireless communication system 100 may shift a reception (RX) window after reordering.

In the methods for MLO provided in the embodiments of the invention, the multiple chip (multi-chip) architecture may be configured into the Wi-Fi chip for MLO. Therefore, a scalable and flexible method for MLO will be achieved.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in the UE. In the alternative, the processor and the storage medium may reside as discrete components in the UE. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for multi-link operation (MLO), applied in an apparatus, comprising:
   assigning, by a multi-chip controller of the apparatus, different data to a plurality of chips of the apparatus, wherein each chip corresponds to one link of multi-links;
   determining, using each of the chips, whether transmission of the assigned data corresponding to each chip has failed; and
   transmitting, by a first chip of the plurality of chips, the assigned data to an access point (AP) in response to the first chip determining that the transmission of the assigned data corresponding to the first chip has not failed.

2. The method for MLO of claim 1, further comprising:
   transmitting, by the first chip, a retransmission request to a cross-chip controller of the apparatus in response to the first chip determining that the transmission of the assigned data has failed; and
   assigning, by the cross-chip controller, the assigned data originally assigned to the first chip to another chip.

3. The method for MLO of claim 2, further comprising:
   performing, by the cross-chip controller, a cross-chip timing synchronization for the plurality of chips; and
   updating, by the cross-chip controller, a medium access control (MAC) PDU (MPDU) lifetime.

4. The method for MLO of claim 1, further comprising:
   assigning, by the multi-chip controller, a sequence number (SN) or a packet number (PN) to each data based on a transmission (TX) window; and
   assigning, by the multi-chip controller, different data to the plurality of chips of the apparatus based on the assigned SNs and PNs.

5. The method for MLO of claim 1, further comprising:
   transmitting, by the first chip, an acknowledgement (ACK) report to the multi-chip controller, in response the assigned data having been transmitted to the AP successfully.

6. The method for MLO of claim 4, further comprising:
   shifting, by the multi-chip controller, a TX window in response to receiving the ACK report from the first chip.

7. The method for MLO of claim 1, further comprising:
   reordering, by a cross-chip controller of the apparatus, received data from the plurality of chips.

8. The method for MLO of claim 7, further comprising:
   shifting, by the cross-chip controller, a reception (RX) window after reordering.

9. An apparatus for multi-link operation (MLO), comprising:
   a transceiver, configured to perform wireless transmission and reception to and from an access point (AP);
   a Wi-Fi chip, comprising a multi-chip controller, a cross-chip controller and a plurality of chips, wherein each chip corresponds to one link of multi-links;
   a processor, coupled to the transceiver and the Wi-Fi chip, and controlling the Wi-Fi chip to:
   assign different data to the plurality of chips of the apparatus through the multi-chip controller;
   determine, via each of the plurality of chips, whether transmission of the assigned data corresponding to each chip has failed; and
   transmit, via a first chip of the plurality of chips, the assigned data to the AP through the transceiver in response to the first chip determining that the transmission of the assigned data corresponding to the first chip has not failed.

10. The apparatus for MLO of claim 9, wherein the first chip transmits a retransmission request to the cross-chip controller in response to the first chip determining that the transmission of the assigned data has failed, and the cross-chip controller assigns the assigned data originally assigned to the first chip to another chip of the plurality of chips.

11. The apparatus for MLO of claim 10, wherein the cross-chip controller further performs a cross-chip timing synchronization for the plurality of chips, and updates a medium access control (MAC) PDU (MPDU) lifetime.

12. The apparatus for MLO of claim 9, wherein the multi-chip controller further assigns a sequence number (SN) or a packet number (PN) to each data based on a transmission (TX) window, and assigns different data to the plurality of chips of the apparatus based on the assigned SNs and PNs.

13. The apparatus for MLO of claim 9, wherein the first chip further transmits an acknowledgement (ACK) report to the multi-chip controller, in response the assigned data having been transmitted to the AP successfully.

14. The apparatus for MLO of claim 13, wherein the multi-chip controller shifts a TX window in response to receiving the ACK report from the first chip.

15. The apparatus for MLO of claim 9, wherein the cross-chip controller further reorders received data from the plurality of chips.

16. The apparatus for MLO of claim 15, wherein the cross-chip controller shifts a reception (RX) window after reordering.

17. A Wi-Fi chip for multi-link operation (MLO), comprising:
   a multi-chip controller;
   a cross-chip controller; and
   a plurality of chips, wherein each chip corresponds to one link of multi-links,
   wherein the multi-chip controller assigns different data to the plurality of chips,
   wherein each of the plurality of chips determines whether transmission of the assigned data corresponding to each chip has failed,
   wherein a first chip of the plurality of chips transmits the assigned data to an access point (AP) in response to the first chip determining that the transmission of the assigned data corresponding to the first chip has not failed.

18. The Wi-Fi chip for MLO of claim 17, wherein the first chip transmits a retransmission request to the cross-chip controller in response to the first chip determining that the transmission of the assigned data has failed, and the cross-chip controller further performs a cross-chip timing synchronization for the plurality of chips, updates a medium access control (MAC) PDU (MPDU) lifetime, and assigns the assigned data originally assigned to the first chip to another chip of the plurality of chips.

19. The Wi-Fi chip for MLO of claim 17, wherein the multi-chip controller further assigns a sequence number (SN) or a packet number (PN) to each data based on a transmission (TX) window, and assigns different data to the plurality of chips based on the assigned SNs and PNs.

20. The Wi-Fi chip for MLO of claim 17, wherein the cross-chip controller further reorders received data from the plurality of chips, and shifts a reception (RX) window after reordering.

* * * * *